(12) United States Patent
Weber et al.

(10) Patent No.: US 9,728,786 B2
(45) Date of Patent: Aug. 8, 2017

(54) ELECTRODE HAVING ACTIVE MATERIAL ENCASED IN CONDUCTIVE NET

(71) Applicant: NISSAN NORTH AMERICA, INC., Franklin, TN (US)

(72) Inventors: Jessica Weber, Berkley, MI (US); Nilesh Dale, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 9 days.

(21) Appl. No.: 14/975,901

(22) Filed: Dec. 21, 2015

(65) Prior Publication Data
US 2017/0179494 A1  Jun. 22, 2017

(51) Int. Cl.
| | |
|---|---|
| *H01M 4/38* | (2006.01) |
| *H01M 4/66* | (2006.01) |
| *H01M 4/134* | (2010.01) |
| *H01M 4/74* | (2006.01) |
| *H01M 10/0525* | (2010.01) |
| *H01M 4/62* | (2006.01) |
| *H01M 4/36* | (2006.01) |
| H01M 4/02 | (2006.01) |

(52) U.S. Cl.
CPC ......... *H01M 4/663* (2013.01); *H01M 4/134* (2013.01); *H01M 4/364* (2013.01); *H01M 4/386* (2013.01); *H01M 4/387* (2013.01); *H01M 4/625* (2013.01); *H01M 4/74* (2013.01); *H01M 10/0525* (2013.01); *H01M 2004/027* (2013.01); *H01M 2220/20* (2013.01)

(58) Field of Classification Search
CPC .......... H01M 10/0525; H01M 2/1653; H01M 4/136; H01M 4/587; H01M 4/463; H01M 4/485; H01M 4/38; H01M 4/525
See application file for complete search history.

(56) References Cited

U.S. PATENT DOCUMENTS

| | | |
|---|---|---|
| 8,338,019 B2 | 12/2012 | Lee et al. |
| 8,669,008 B2 | 3/2014 | Cho et al. |
| 8,808,919 B2 | 8/2014 | Kim |
| 8,870,978 B2 | 10/2014 | Yun et al. |
| 8,974,966 B2 | 3/2015 | Kim et al. |
| 9,005,819 B2 | 4/2015 | Kwon et al. |

(Continued)

FOREIGN PATENT DOCUMENTS

| | | |
|---|---|---|
| CN | 103779570 A | 5/2014 |
| JP | 2003297353 A | 10/2003 |

(Continued)

*Primary Examiner* — Stewart Fraser
*Assistant Examiner* — Monique Wills
(74) *Attorney, Agent, or Firm* — Young Basile Hanlon & MacFarlane, P.C.

(57) ABSTRACT

An anode for a lithium-ion battery includes a current collector, a separator and an active material comprising alloying particles and a carbon material. A conductive net of carbon material surrounds the active material on at least the side walls and a separator-facing surface, the conductive net having net openings sized to retain the alloying particles and the carbon material within the conductive net while allowing lithium ions and electrons to pass through. The conductive net also maintains electrical contact between the carbon material and the alloying particles during lithiation and delithiation of the alloying particles.

16 Claims, 2 Drawing Sheets

(56) References Cited

U.S. PATENT DOCUMENTS

| | | | |
|---|---|---|---|
| 2007/0148550 A1 | 6/2007 | Hasegawa et al. | |
| 2009/0269666 A1* | 10/2009 | Lara-Curzio | H01M 4/16 |
| | | | 429/225 |
| 2013/0032278 A1 | 2/2013 | Ottinger et al. | |
| 2013/0260237 A1 | 10/2013 | Chang et al. | |
| 2013/0330617 A1 | 12/2013 | Yoshimura et al. | |
| 2014/0255742 A1 | 9/2014 | Kwon et al. | |
| 2015/0263379 A1* | 9/2015 | Xiao | H01M 10/0525 |
| | | | 429/161 |
| 2015/0380729 A1* | 12/2015 | Kojima | H01M 4/136 |
| | | | 429/220 |

FOREIGN PATENT DOCUMENTS

| | | |
|---|---|---|
| JP | 2005293960 A | 10/2005 |
| WO | 2009141691 A2 | 11/2009 |
| WO | 2013021630 A1 | 2/2013 |

* cited by examiner

ELECTRODE HAVING ACTIVE MATERIAL ENCASED IN CONDUCTIVE NET

TECHNICAL FIELD

This disclosure relates to an active material for use in an electrode, the active material being encased in a conductive net to maintain conductive contact between active material particles and reduce loss of active material.

BACKGROUND

Hybrid vehicles (HEV) and electric vehicles (EV) use chargeable-dischargeable power sources. Secondary batteries such as lithium-ion batteries are typical power sources for HEV and EV vehicles. Lithium-ion secondary batteries typically use carbon, such as graphite, as the anode electrode. Graphite materials are very stable and exhibit good cycle-life and durability. However, graphite material suffers from a low theoretical lithium storage capacity of only about 372 mAh/g. This low storage capacity results in poor energy density of the lithium-ion battery and low electric mileage per charge.

To increase the theoretical lithium storage capacity, silicon has been added to active materials. However, silicon active materials suffer from rapid capacity fade, poor cycle life and poor durability. One primary cause of this rapid capacity fade is the massive volume expansion of silicon (typically up to 300%) upon lithium insertion. Volume expansion of silicon causes particle cracking and pulverization. This deteriorative phenomenon escalates to the electrode level, leading to electrode delamination, loss of porosity, electrical isolation of the active material, increase in electrode thickness, rapid capacity fade and ultimate cell failure.

SUMMARY

Disclosed herein are electrodes with the active material encased in a conductive net to maintain conductive contact between active material particles and reduce loss of active material.

An anode for a lithium-ion battery disclosed herein includes a current collector, a separator and an active material layer comprising alloying particles and a carbon material. A conductive net of carbon material surrounds the active material layer on at least the side walls and a separator-facing surface of the active material layer, the conductive net having net openings sized to retain the alloying particles and the carbon material within the conductive net while allowing lithium ions and electrons to pass through. The conductive net also maintains electrical contact between the carbon material and the alloying particles during lithiation and delithiation of the alloying particles.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
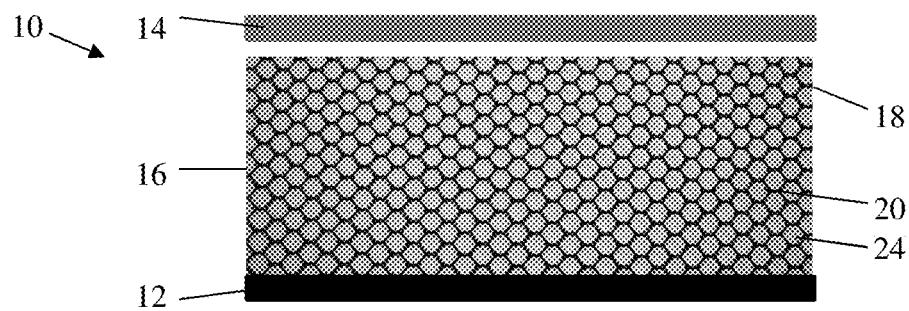
FIG. 1 illustrates a side view of an electrode as disclosed herein.

Because the carbon material used in electrodes of conventional batteries, such as lithium ion batteries or sodium ion batteries, suffers from a low specific capacity, the conventional battery has poor energy density even though there is small polarization and good stability. Furthermore, batteries having electrodes of graphite or other carbon materials develop increased internal resistance over time, which decreases their ability to deliver current.

To address the poor energy density of carbon based electrodes, alternative active materials with higher energy densities are desired. Alloying particles such as silicon, tin, germanium and their oxides and alloys are non-limiting examples of materials that may be added to an electrode active material layer to improve its energy density, among other benefits.

One particular example is the use of silicon in lithium-ion batteries. Electrode materials such as silicon react with lithium via a different mechanism than graphite. Lithium forms alloys with silicon materials, which involves breaking the bonds between host atoms, causing dramatic structural changes in the process. Since the silicon does not constrain the reaction, anode materials that form alloys can have much higher specific capacity than intercalation electrode materials such as graphite. Silicon based anode active materials have potential as a replacement for the carbon material of conventional lithium-ion battery anodes due to silicon's high theoretical lithium storage capacity of 3500 to 4400 mAh/g. Such a high theoretical storage capacity could significantly enhance the energy density of the lithium-ion batteries. However, silicon active materials suffer from rapid capacity fade, poor cycle life and poor durability. One primary cause of this rapid capacity fade is the massive volume expansion of silicon (typically up to 300%) and structural changes due to lithium insertion. Volume expansion of silicon can cause particle cracking and pulverization when the silicon has no room to expand, which leads to delamination of the active material from the current collector, electrical isolation of the fractured or pulverized active material, capacity fade due to collapsed conductive pathways and loss of active material, and increased internal resistance over time.

Disclosed herein are active material layers for use in electrodes, electrodes using the active material layers, and batteries using the electrodes. The active material layer comprises alloying materials, which, as used herein, are active catalyst particles that alloy with lithium and have a high lithium storage capacity resulting in large volume expansions during lithiation. The active material layer is surrounded on all sides and at least a separator-facing surface with an elastic and conductive net. This conductive net allows for expansion of the alloying material in at least one direction, protecting the separator from damage. This conductive net also retains active material in the net, preventing shorts and maintaining the requisite activity of the electrode and keeping active material in conductive contact with each other. The conductive net also contributes to the capacity of the active material layer.

One example of an electrode is illustrated in FIG. 1. An anode 10 for a lithium-ion battery has a current collector 12, a separator 14 and an active material layer 16 comprising alloying particles and a carbon material. A conductive net 18 of carbon material surrounds the active material 16 on at least side walls 20 and a separator-facing surface 22 of the active material layer 16. The conductive net 18 has net openings 24 sized to retain the alloying particles and the carbon material within the conductive net 18 while allowing lithium ions and electrons to pass through. The conductive net 18 also maintains electrical contact between the carbon material and the alloying particles during lithiation and delithiation of the alloying particles.

The conductive net 18 can be, for example, a carbon cloth. Other carbon material can also be used to form the conductive net, such as carbon black, graphene, or carbon nanotubes. Other materials known to those skilled in the art that are conductive, non-electrochemically reactive with lithium, elastic, and able to retain net openings for ion and electron transport can also be used.

The alloying particles of the active material layer 16 can be silicon-based or tin-based, for example. The silicon-based particles can be silicon, a silicon alloy, a silicon/germanium composite, silicon oxide and combinations thereof. The tin-based particles can be tin, tin oxide, a tin alloy and combinations thereof. Other high energy density materials known to those skilled in the art are also contemplated. The carbon material can include one or more of graphene, graphite, surface modified graphite, carbon nanotubes, carbon black, hard carbon, soft carbon and any other carbon materials known to those skilled in the art having the requisite electrochemical activity.

The conductive net 18 can surround all sides of the active material layer 16, including the side walls 20, the separator-facing surface 22 and a collector-facing surface 26, with the conductive net 18 in direct contact with the current collector 12. As illustrated in FIG. 1, the conductive net 18 is spaced from the separator 14 to allow for expansion of the alloying particles in a stacking direction of the anode 10.

Figure 2:
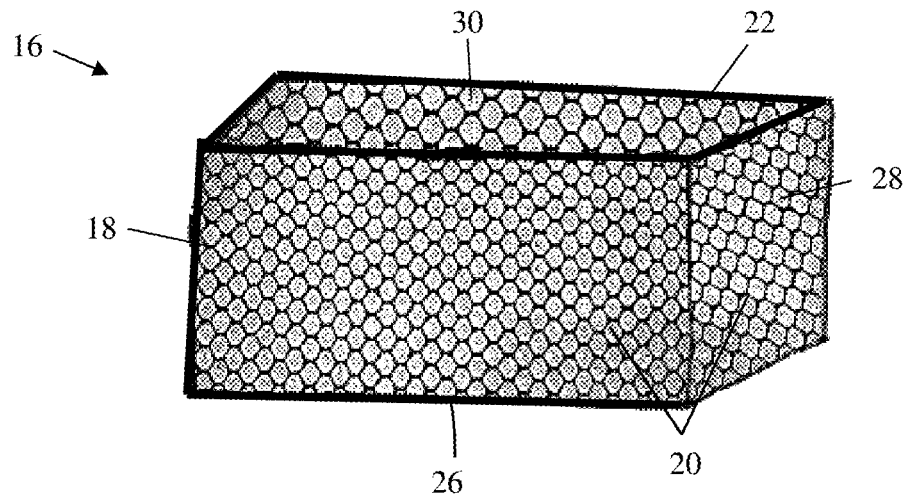
FIG. 2 illustrates a perspective view of side walls and a separator-facing surface of an active material layer surrounded by a conductive net.

The conductive net 18 has apertures or openings 24 to allow lithium ions and electrons to pass through the conductive net 18. The net openings 24 can be uniform in size across all of the surfaces of the active material layer 16. Alternatively, as illustrated in FIG. 2, the net openings 24 can have a first size 28 on the side walls 20 and a second size 30 on the separator-facing surface 22 and the collector-facing surface 26 if the conductive net 18 is used on the collector-facing surface 26. The first size 28 is different from the second size 30, and can be smaller than the second size 30. It is also contemplated that the sizes of the net openings 24 are non-uniform across all surfaces.

A conductive adhesive can be used between the active material layer 16 and the conductive net 18 when forming the anode 10 to encase the active material layer 16 in the conductive net 18. The conductive adhesive can also be used to adhere the conductive net 18 to the current collector 12 when the conductive net 18 is used on the collector-facing surface 26 of the active material layer 16.

Figure 3:
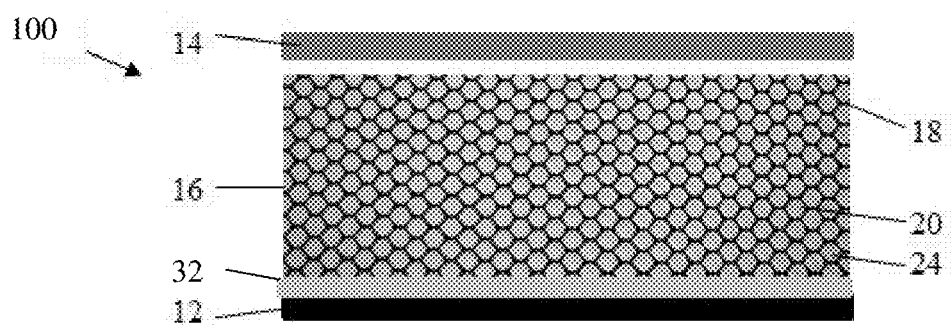
FIG. 3 illustrates a side view of another embodiment of an electrode as disclosed herein.

In another alternative of the anode 100, a buffer layer 32 can be coated on the current collector 12, with the active material layer 16 coated on the buffer layer 32 and the conductive net 18 formed on the side walls 20 and on the separator-facing surface 24 of the active material layer 16, as shown in FIG. 3. The buffer layer 32 is a conductive material that is chemically inert and configured to buffer the current collector 12 from expansion of the alloying particles during lithiation.

Also disclosed is lithium-ion battery incorporating the anodes 10, 100 disclosed herein. The power generating element of the lithium-ion battery includes a plurality of unit cell layers each including a cathode active material layer, an electrolyte layer and the anode active material layer 16 disclosed herein. The cathode active material layer is formed on one surface of a current collector and electrically connected thereto and the anode active material layer 16 is formed on the other surface of the current collector and electrically connected thereto. Each of the electrolyte layers includes a separator serving as a substrate and an electrolyte supported by the separator.

Examples of the cathode active material layer may include lithium-transition metal composite oxides such as $LiMn_2O_4$, $LiCoO_2$, $LiNiO_2$, $Li(Ni$—$Co$—$Mn)O_2$, lithium-transition metal phosphate compounds, and lithium-transition metal sulfate compounds. These are provided by means of example and are not meant to be limiting. As the electrolyte constituting the electrolyte layer, a liquid electrolyte, a gel electrolyte or a polymer electrolyte known to those skilled in the art may be used. As examples, the liquid electrolyte may be in the form of a solution in which a lithium salt is dissolved in an organic solvent. The gel electrolyte may be in the form of a gel in which the above mentioned liquid electrolyte is impregnated into a matrix polymer composed of an ion conductive polymer. When the electrolyte layers are formed by a liquid electrolyte or gel electrolyte, a separator may be used in the electrolyte layer. Examples of the separators are porous films of polyolefin such as polyethylene and polypropylene. The current collector is composed of a conductive material serving as a joining member for electrically connecting the active material layers to the outside.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A or B, X can include A alone, X can include B alone or X can include both A and B. In addition, the articles "a" and "an" as used in this application and the appended claims should generally be construed to mean "one or more" unless specified otherwise or clear from context to be directed to a singular form.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

Other embodiments or implementations may be within the scope of the following claims.

What is claimed is:

1. An anode for a lithium-ion battery comprising:
   a current collector;
   a separator;
   an active material layer between the current collector and the separator having a collector-facing surface, a separator-facing surface and side walls extending around a perimeter of the active material layer, the active material layer comprising alloying particles and a carbon material; and
   a conductive net of carbon material surrounding the active material layer on at least the side walls of the active material layer and the separator-facing surface of the active material layer, the conductive net having net openings sized to retain the alloying particles and the carbon material within the conductive net while allowing lithium ions and electrons to pass through, the conductive net maintaining electrical contact between the carbon material and the alloying particles during lithiation and delithiation of the alloying particles.

2. The anode of claim 1, wherein the alloying particles comprise one or more of silicon, tin and germanium.

3. The anode of claim 1, wherein the conductive net is a carbon cloth.

4. The anode of claim 1, wherein the conductive net surrounds all sides of the active material layer, the conductive net in direct contact with the current collector and spaced from the separator.

5. The anode of claim 4, wherein the net openings have a first size on the side walls and a second size on the separator-facing surface and the collector-facing surface, the first size different from the second size.

6. The anode of claim 5, wherein in the first size is smaller than the second size.

7. The anode of claim 1, wherein the conductive net is formed of carbon black, graphene, or carbon nanotubes.

8. The anode of claim 1, wherein the net openings are uniform is size across all surfaces.

9. The anode of claim 1, wherein the net openings have a first size on the side walls and a second size on the separator-facing surface, the first size different from the second size.

10. The anode of claim 9, wherein the first size is smaller than the second size.

11. The anode of claim 1, further comprising a conductive adhesive between the active material layer and the conductive net.

12. The anode of claim 1 further comprising:
a buffer layer coated on the current collector, wherein the active material layer is coated on the buffer layer and the conductive net is formed on the remaining surfaces of the active material layer.

13. The anode of claim 12, wherein the buffer layer is a conductive material that is chemically inert, the buffer layer configured to buffer the current collector from expansion of the alloying particles during lithiation.

14. A lithium ion battery comprising the anode of claim 1.

15. An anode for a lithium-ion battery comprising:
a current collector;
a separator;
an active material layer comprising alloying particles and a carbon material; and
a conductive net of carbon material surrounding the active material layer surrounding all sides of the active material layer, the conductive net in direct contact with the current collector and spaced from the separator, the conductive net having net openings sized to retain the alloying particles and the carbon material within the conductive net while allowing lithium ions and electrons to pass through, the conductive net maintaining electrical contact between the carbon material and the alloying particles during lithiation and delithiation of the alloying particles, wherein the net openings have a first size on side walls and a second size on a separator-facing surface and a collector-facing surface, the first size different from the second size.

16. An anode for a lithium-ion battery comprising:
a current collector;
a separator;
an active material layer comprising alloying particles and a carbon material; and
a conductive net of carbon material on at least side walls of the active material layer and a separator-facing surface of the active material layer, the conductive net in direct contact with the current collector and spaced from the separator, the conductive net having net openings sized to retain the alloying particles and the carbon material within the conductive net while allowing lithium ions and electrons to pass through, the conductive net maintaining electrical contact between the carbon material and the alloying particles during lithiation and delithiation of the alloying particles, wherein the net openings have a first size on the side walls and a second size on the separator-facing surface, the first size different from the second size.

* * * * *